J. & C. MORTON.
ANIMAL TRAP.
APPLICATION FILED MAY 14, 1915.
1,184,558.
Patented May 23, 1916.
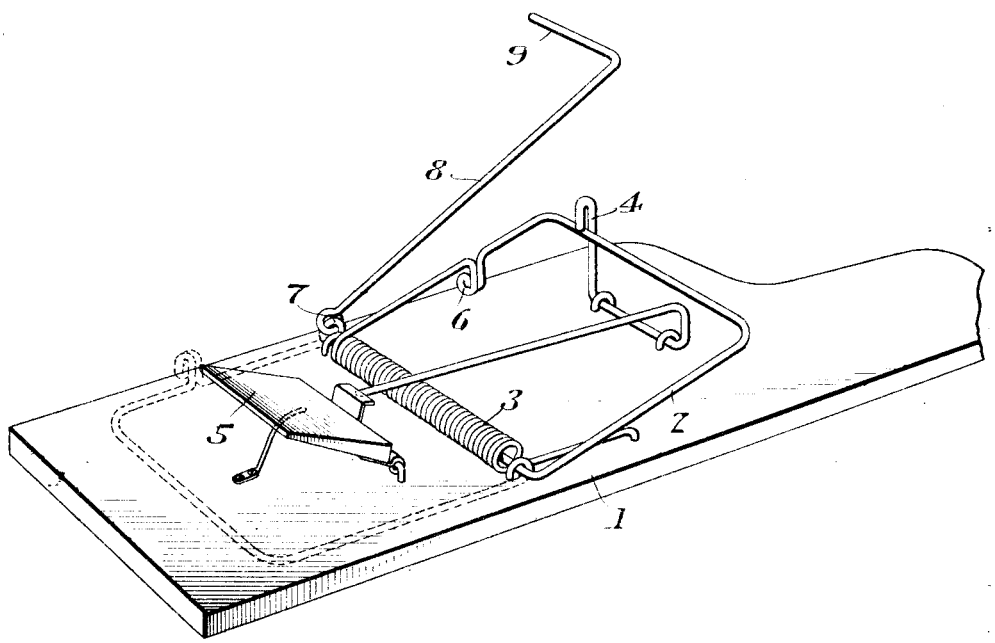
Witness
M. E. Laughlin
Inventors
J. Morton and C. Morton,
By Victor J. Evans
Attorney

UNITED STATES PATENT OFFICE.

JOHN MORTON AND CHARLES MORTON, OF BROOKLYN, NEW YORK.

ANIMAL-TRAP.

1,184,558.  Specification of Letters Patent.  Patented May 23, 1916.

Application filed May 14, 1915. Serial No. 28,164.

*To all whom it may concern:*

Be it known that we, JOHN MORTON and CHARLES MORTON, citizens of Sweden, residing at Brooklyn, in the county of Kings and State of New York, have invented new and useful Improvements in Animal-Traps, of which the following is a specification.

This invention relates to animal traps and it consists in the novel features hereinafter described and claimed.

An object of the invention is to provide in combination with an animal trap having a spring actuated jaw, means for readily opening the jaw in order that the same may be set and at the time that the trap is baited for use.

With this object in view the jaw of the trap is provided at its side with a hook and a bar is pivotally mounted upon the base of the trap and is engageable with the hook for the purpose of swinging the door to an open position against the tension of the spring, which forces the door to a closed position when it is released.

In the accompanying drawing the figure is a perspective view of the trap.

As illustrated in the accompanying drawing, the trap includes a base 1 having a jaw 2 pivoted thereon and actuated by a spring 3 in the usual manner. A trip 4 is pivotally mounted upon the base 1 and is engageable with the free edge portion of the jaw 2 for the purpose of holding the same in an open position, as illustrated in the drawing. A spring pressed bait holder 5 is pivotally mounted upon the base 1 and is engageable with the trip 4 for the purpose of holding the same against movement and for holding the said trip in engagement with the jaw.

The jaw 2 is preferably made from a piece of wire or rod and the material constituting the jaw is formed at one side edge of the jaw into a hook 6. Consequently, the said hook is fixed with relation to the jaw. An eye 7 is mounted upon the base 1 beyond one side of the jaw 2 and a bar 8 is pivotally connected at one end with the said eye for universal swinging movement. At its other end the bar 8 is provided with a laterally disposed extremity 9 which may be used as a handle for swinging the said bar with relation to the eye 7. The bar 8 and the eye 7 are located adjacent the same side of the jaw 2 as that side at which the hook 6 is located.

When it is desired to set the trap and swing the jaw 2 thereof to an open position, the operator grasps the extremity 9 of the bar 8 and positions the intermediate portion of the said bar in the hook 6. The bar 8 is then swung toward that end portion of the trip 4 which is the more remote from the bait holder 5 and the jaw 2 is carried back with the bar so that the free edge portion of the said jaw may be readily engaged under the retaining end of the trip 4. After the jaw has been moved to the open position indicated, the bait holder 5 is engaged with the other end of the trip and the bar 8 may then be removed from the hook 6 and permitted to fall and lie upon the upper surface of the base 1. Therefore it will be seen that a simple and an efficient means is provided for swinging the jaw of a trap to an open position, notwithstanding the fact that the spring which actuates the jaw is strong or under heavy tension. Furthermore during the operation of swinging the jaw to an open position, the hands and fingers of the operator are beyond the side edges of the jaw and consequently, should the jaw accidentally fly to a closed position under the influence of the spring, it is not liable that the fingers or hand of the operator will be caught under the jaw and injured.

Having described the invention what is claimed is:—

A trap comprising a base, a spring actuated jaw pivotally mounted thereon, said jaw being formed from wire and the wire at one side thereof being shaped in the form of a hook which is located between the pivot and free edge of the jaw, and a bar pivotally mounted upon the base at a point approximately in alinement with the axis upon which the jaw is mounted for universal pivotal movement and engageable with the said hook to swing the jaw to an open position.

In testimony whereof we affix our signatures in presence of two witnesses.

JOHN MORTON.
CHARLES MORTON.

Witnesses:
 HENRY TILLY,
 G. A. ROBERG.